Sept. 24, 1946.	T. HEIL	2,408,141
TOY
Filed March 7, 1944

Inventor
Theodore Heil
By Philip A. Friedell
Attorney

Patented Sept. 24, 1946

2,408,141

UNITED STATES PATENT OFFICE 2,408,141

TOY

Theodore Heil, Berkeley, Calif.

Application March 7, 1944, Serial No. 525,398

5 Claims. (Cl. 46—45)

This invention, a fishing toy or game, is designed primarily for the amusement of children, though it serves also as a very interesting game for children or adults, and can be made very exciting as a game of skill.

As a toy, it proves itself invaluable for children who are physically handicapped, as also for children who may be ill or injured, but in condition to use one or both of their hands. It provides interest and a measure of activity which in many cases is definitely beneficial. And for children who are in good health and good physical condition, it serves not only as a toy, but also as a game of skill to be played by several at a time.

The objects and advantages of the invention are as follows:

First, to provide a toy which will prove interesting to children.

Second, to provide a toy which will prove instructive in the sport of angling.

Third, to provide a toy which can be developed into a game of skill to be played by a group of children or adults.

Fourth, to provide a game of skill for children or adults which is both, interesting and exciting, and which will prove instructive in the art of fishing.

Fifth, to provide a fishing toy which includes a rod, reel, line, a permanent magnet functioning as a hook, and simulative fish made in different sizes and species and formed of floatable material with a mouth formed of magnetizable metal.

Sixth, to provide a fishing game in which the fish are formed of a floatable material counterweighted on the belly side to keep the fish in a normal position, and with the specific gravity of the mass equal to that of the water so that the fish will float around within the body of water, and with the water rendered non-transparent or located to make the fish invisible.

Seventh, to provide a fishing toy including a rod, a reel or imitation thereof including a keeper for a permanent magnet functioning as a fish hook, a line connecting the magnet with the rod, and a plurality of fish formed of floatable material and having magnetizable metal in the vicinity of the mouths for cooperation with the magnet.

Eighth, to provide a toy as outlined which is simple in construction, economical to manufacture, and light in weight.

Other objects and advantages of the invention will become apparent as the following description is read on the drawing forming a part of this specification, and in which.

Figure 3:
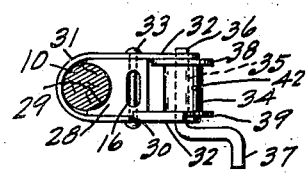
Fig. 3 is a top plan view of Fig. 2 with the magnet removed.
Figure 5:
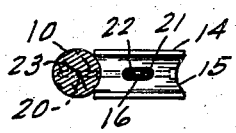
Fig. 5 is a top plan view of Fig. 4 with the magnet removed.
Figure 4:
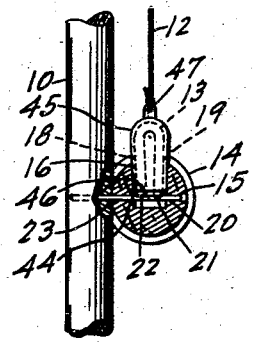
Fig. 4 is a modification in which the reel is purely imitative and inoperative except as a holder and keeper for the magnet.
Figure 6:
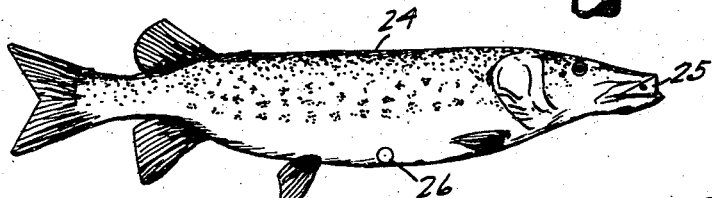
Fig. 6 is a side elevation of a simulative fish forming a part of this invention.

The toy may be of the utmost simplicity as illustrated in Figs. 4 and 5, or may be elaborated to any desired degree as illustrated in Figs. 1, 2, 3 and 6. The fish may be made to represent different species and in different sizes, and may be made plain in coloring or embellished with the natural colorings and markings of the species as indicated in Fig. 6.

The rod 10 may be made of wood, bamboo, metal, or any suitable thermo-plastic, wood doweling being the most economical, and perfectly satisfactory. The rod may be cylindrical or tapered toward the tip 11. With the simulative reel, Figs. 4 and 5, one end of the line 12 is attached to the tip 11 and the permanent magnet 13 is attached to the other end, and the line is preferably of just proper length so that the magnet will reach the keeper and keep the line just slightly taut.

The simulative reel shown in Figs. 4 and 5 consists of a spool 14 having an annular concave groove 15 to fit the contour of the rod 10 as shown. Two holes 16 and 17 are drilled past the center of the spool as shown and spaced to receive the respective legs 18 and 19 of the magnet 13. A conventional brad 20 serves well as the securing means and is driven through the center of the spool so that the brad extends through the holes 16 and 17 as shown at 21 and 22, and secures the spool to the rod as indicated at 23. Thus the brad or nail functions as the keeper for the magnet and as securing means for securing the reel to the rod, and the magnet is supported against lateral movement or displacement by the walls of the holes.

As just described, this is the simplest form of the tackle including rod, line, magnet, and reel functioning as a keeper and support for the magnet when the toy is not in use.

The fish 24 may be made of any suitable material, such as wood, pressboard, or other floatable material, or even of thermo-plastics suitably hollowed to provide buoyancy. However, pressboard is most suitable for an inexpensive toy, merely requiring blanking, coating with a waterproof coating, and spraying with suitable color or colors. A magnetizable metal clip 25 is secured to form the open mouth of the fish, and the belly portion of the fish is loaded as by a lead slug 26 pressed in place to cause the fish to float in a normal position in the water 27 as indicated in Fig. 1.

For games, the fish are to be distinctly formed and embellished with natural colorings and markings, and in different sizes so that different point values may be assigned for different species and sizes. For such purposes a very satisfactory material for making the fish is a composition of wood pulp and a binder with a specific gravity below 1.00 and pressed and/or molded to form including a slug of heavy material such as lead in the belly portion to increase the specific gravity of the mass to 1.00 so that the fish will float in, not on the water. Under such conditions the fish will float right side up at different levels in the water from just breaking the surface to lying on the bottom of the vessel, and will be caused to move about with the slightest agitation such as that caused by the magnet.

Figure 1:
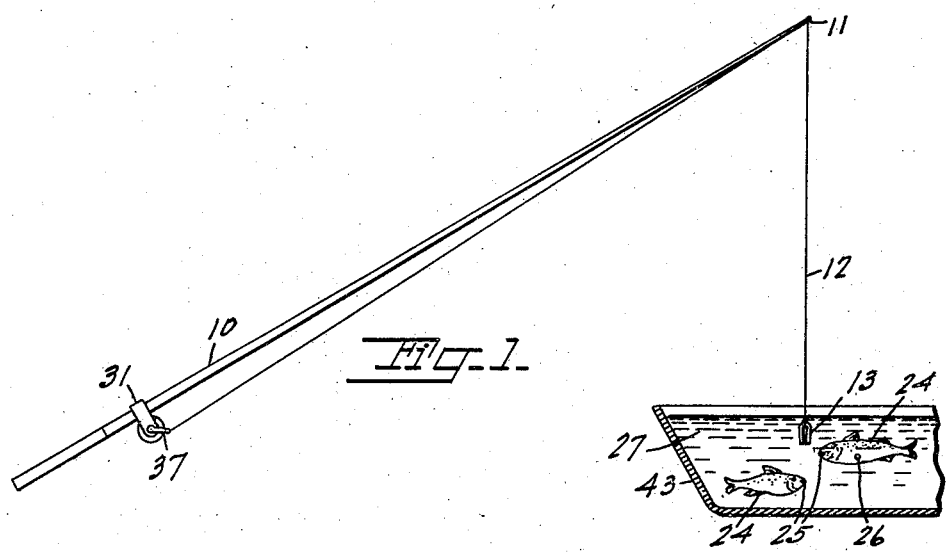
Fig. 1 is a side elevation of the invention shown in connection with a suitable container and supply of water.
Figure 2:
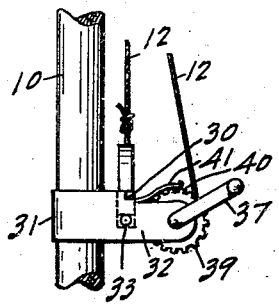
Fig. 2 is a side elevation of the combined reel and keeper, showing the magnet in place and cooperating with the keeper when the toy is not in use.

For the more expensive variety of toy, and for games, an operable reel is preferably provided as illustrated in Figs. 1, 2 and 3. The reel as shown consists of a block 28 of wood formed concave at the back as indicated at 29 to fit the frontal contour of the rod and has an elongated slot 16' formed from the upper face toward the bottom to receive the legs of the magnet, and has a recess 30 formed in one side. A U-shaped spring metal band 31 extends around the back of the rod 10 and along the sides of the block and the arms 32 thereof extend forwardly beyond the front face of the block, and a magnetizable metal rivet or pin 33 secures the band to the block and extends through the lower portions of the slot to function as the keeper for the magnet when not in use.

A spool 34 has an axial bore 35 to frictionally fit the shaft 36 which has bearings in holes formed in the arms 32 of the U-shaped member 31 and is formed into a crank 37 at one end, the spool having flanges 38 and 39, one of which as 39 is serrated as indicated at 40 for cooperation with a spring pawl or click 41 formed from the upper side of one of the arms 32 as shown and the end of which lies in the clearance recess 30 of the block. Due to the increased radius of the U-shaped member, the reel can be easily assembled on the rod by simply slipping the rod between the return bend and the block and sliding it to the desired position, the resiliency of the member frictionally securing the reel in place. Suitable means, such as a hole 42 is provided in the spool for attaching the line 12.

As a toy, the vessel 43 should contain clear water, and for very small children the specific gravity of the fish should be slightly less than the water so that they will float at the surface. For more matured children the specific gravity should be the same as the water (slight variations from 1.00 are inconsequential) and clear water should be provided.

As a game, each player must have rod and tackle, and all start fishing at a given signal, with point values based on the species, sizes, and number of fish caught in a given time. The specific gravity of the fish must not be less than 1.00 but may be very slightly higher, say 1.02, and the water should be either rendered non-transparent so that the fish cannot be seen, or the vessel should be at an elevation at which the fish cannot be seen by the players. The vessel should be of ample volume for the number of players, a tub usually serving the purpose satisfactorily. Substances such as clay or other suspensible products or materials, or even milk can be used to make the water non-transparent.

Movement of the magnet in the water causes the fish to move, and unless the magnet closely approaches the clip on the mouth of the fish, the fish will not be caught, and since the fish cannot be seen by the player, the game becomes one of chance and skill, particularly when the magnet is covered completely with the exception of the very ends of the legs as indicated at 44, the cover being preferably made of live rubber in the form of a sack 45 with two holes in the lower end as indicated at 46 so that the magnet can be easily threaded into the sack, and this cover is provided with an eyelet 47 at the upper end for attachment of the line 12. Thus only the tips of the magnetic legs will be exposed and capable of lifting the fish out of the water, the broad surfaces of the cover will increase the agitation of the water, increasing the difficulties of catching the fish, and furthermore, the cover provides protection simultaneously against chipping glass containers or enameled or porcelain lined containers such as dishpans or bath tubs, and, against de-magnetization through sharp raps against hard objects. Thus the cover functions in four different ways. The cover can be made to simulate some type of lure if desired.

I claim:

1. A simulative reel mounted on the handle portion of a toy fishing rod and having a socket formed therein to receive the legs of a magnet, and a keeper for the magnet located and fixed in the lower portion of said socket, with the walls of the socket functioning as lateral support for the magnet, and the keeper functioning to secure the magnet in the socket.

2. In combination with a toy fishing rod having a tip and a handle portion, a permanent magnet and a line connecting the permanent magnet to the tip; a simulative reel mounted on said handle portion and having a socket for reception and lateral support of the legs of said magnet, and a keeper located in said socket at a distance from the tip equal to the combined length of said line and magnet and simultaneously functioning as a keeper for said magnet, and means for cooperation with said magnet for keeping the line taut along the rod when the rod is not in use.

3. A structure as defined in claim 2; said simulative reel comprising a cylindrical member with its axis transversely to the axis of the rod and secured to the rod; said magnetizable element comprising an elongated member passing diametrically through the simulative reel and its socket and the rod, and coincidently functioning as means for securing the simulative reel to the rod.

4. In combination with a rod having a tip and a handle portion; a simulative reel and non-magnetic material and cylindrical in form and having an elongated socket having walls and formed radially with its major axis at right angles to the axis of the simulative reel and extending to a depth below said axis; a magnetizable metal securing device passing diametrically through said simulative reel and through the bottom portion of said socket and into the handle portion of said rod to secure said simulative reel to said rod; a magnet; a line connecting said magnet to said tip and having a length in connection with said magnet equal to the distance from said tip to said securing device; said securing device simultaneously functioning as a keeper for said magnet, and functioning in cooperation with said magnet to keep said line taut along the rod when the rod is not in use, and the walls of said recess functioning to prevent lateral displacement of said magnet.

5. A block of non-magnetic material having a magnet-leg receiving socket formed therein, and a fastening member of magnetic material passing through said block and across the bottom of said socket and projecting from the block to function as attaching means for attachment to a toy fishing rod and with the portion passing across the bottom of said socket functioning as a keeper for the magnet and as means for removably securing the magnet in the socket.

THEODORE HEIL.